F. WEBB.
PROTECTOR FOR HAND HOLE COVERS.
APPLICATION FILED MAY 23, 1914.
1,130,779. Patented Mar. 9, 1915.
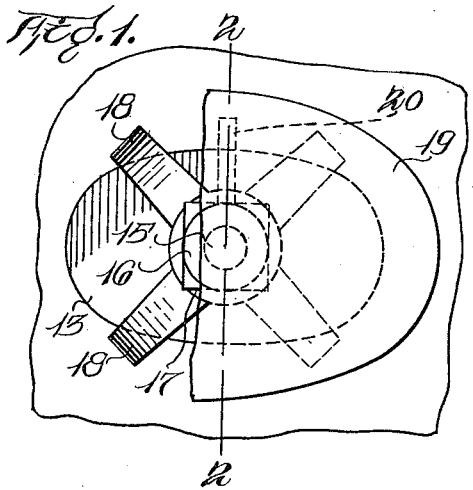
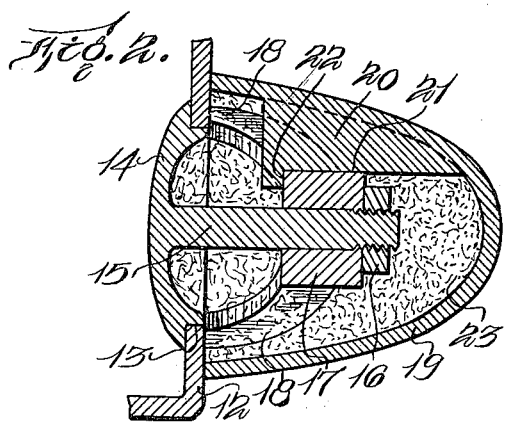
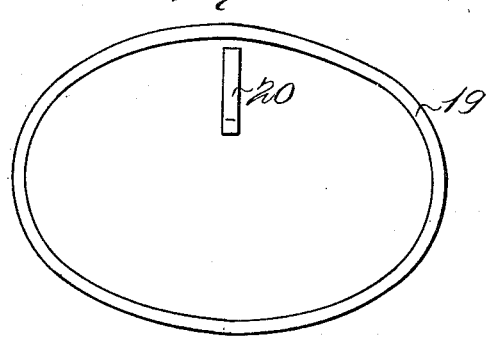
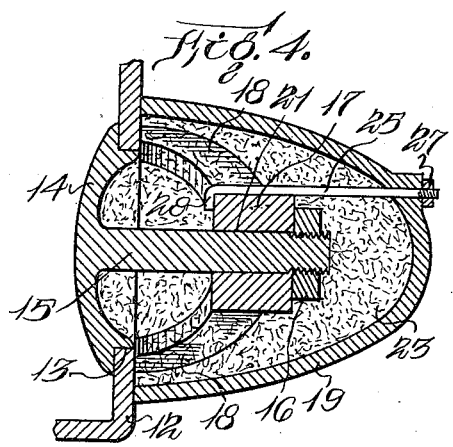
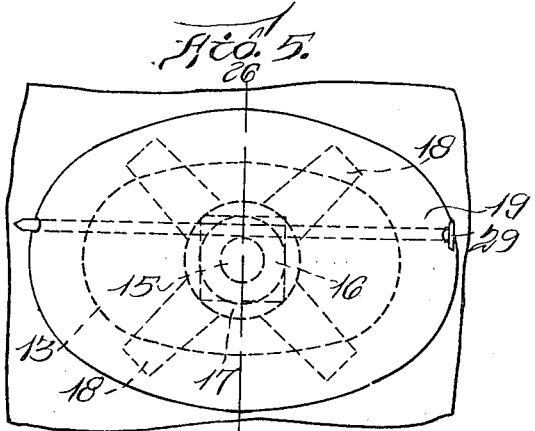
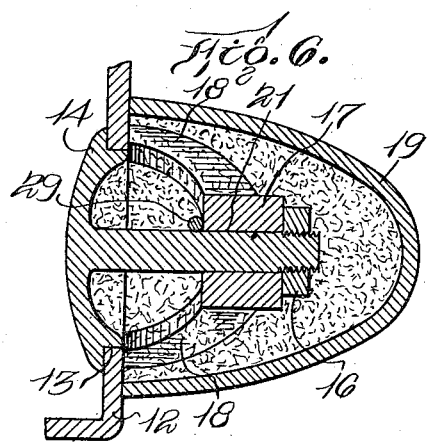
Witnesses:
F. P. Poulstone
N. G. Rahn
Inventor:
Frank Webb
by Wright Brown Quinby May
Attorneys

UNITED STATES PATENT OFFICE.

FRANK WEBB, OF MELROSE, MASSACHUSETTS.

PROTECTOR FOR HAND-HOLE COVERS.

1,130,779.  Specification of Letters Patent.  Patented Mar. 9, 1915.

Application filed May 23, 1914. Serial No. 840,650.

*To all whom it may concern:*

Be it known that I, FRANK WEBB, a citizen of the United States, and resident of Melrose, in the county of Middlesex and State of Massachusetts, have invented certain new and useful Improvements in Protectors for Hand-Hole Covers, of which the following is a specification.

This invention relates to a steam boiler having a hand hole, and a cover therefor seated on the inner surface of the head in which the hand hole is formed and having a bolt projecting outwardly through the hand hole, the cover being detachably secured by a yoke formed to bear on the outer side of the head, and having a hub through which the bolt passes, and a nut engaged with a threaded portion of the bolt and adapted to be set up against the outer end of said hub to hold the cover and yoke against opposite sides of the head.

The nut and the threaded portion of the bolt are exposed to the highly heated products of combustion from the boiler furnace, and are often so affected thereby that the nut becomes inseparably united to the bolt and the bolt is liable to be twisted and broken when the nut is turned to unscrew it from the bolt.

My invention has for its object to provide simple and effective means for so protecting the said bolt and nut that they are not liable to be rendered inseparable by heat.

The invention consists in the improved protector which I will now proceed to describe and claim.

Of the accompanying drawings forming a part of this specification: Figure 1 represents an elevation of a portion of the outer side of a boiler head, showing a hand hole cover secured by the usual bolt, nut, and yoke, and a bolt and nut protector embodying my invention, a part of the protector being broken away; Fig. 2 represents a section on line 2—2 of Fig. 1; Fig. 3 represents an end view of the protector without the heat insulating material hereinafter referred to; Fig. 4 represents a view similar to Fig. 2, showing a modification; Fig. 5 represents a view similar to Fig. 1, showing another modification; Fig. 6 represents a section on line 6—6 of Fig. 5.

The same reference characters indicate the same or similar parts in all the views.

In the drawings, 12 represents a boiler head having a hand hole 13.

14 represents the usual hand hole cover seated on the inner side of the head and having a bolt 15 which projects through the hand hole and is threaded at its outer end portion to engage the nut 16.

17 represents the hub and 18 the arms of the usual yoke, which coöperate with the bolt and nut in securing the cover 14 in place. The bolt passes loosely through the hub 17, and the nut 16 when set up against the outer end of the hub holds the cover 14 against the inner side and the yoke arms 18 against the outer side of the head. The hub 17, arms 18 and nut 16 constitute the usual fastening means, not claimed by me, coöperating with the cover 14, bolt 15, and the boiler head, in securing the cover in place, the cover being removable from the head as usual when the nut and the yoke formed by the hub and arms are removed from the bolt.

19 represents a cup, preferably of cast iron, formed to bear on the outer side of the head 12 around the hand hole 13, and to receive the bolt, the nut, and the yoke. Said cup is provided internally with a member adapted to engage the yoke and to detachably confine the mouth of the cup against the head 12. Said member is preferably a shouldered lug 20 cast on the inner surface of the cup and having a face 21 formed to bear on the upper side of the hub 17, and a face 22 formed to bear at the same time on the inner end of said hub, said faces being so arranged that when they simultaneously engage the upper side and inner end of the hub, the mouth of the cup is held closely against the head 12. The length of the face 22 and the distance between the upper and lower portions of the internal surface of the cup at the mouth thereof are such that the cup can be raised from the position shown by Fig. 2 sufficiently to disengage the face 22 from the inner end of the hub and permit the removal of the cup.

The cup is prepared for use by inserting in it a plastic mass of heat-insulating material 23 composed of loose asbestos mixed with water. The cup is then placed in the position shown by Fig. 2, the plastic material being thus caused to coat the outer portion of the bolt and the exposed surfaces of the nut. Enough plastic material may be provided to coat all the exposed surfaces of the yoke and the outer side of the cover 14, although this is not necessary, it being sufficient to coat the exposed surfaces of the nut and of the outer portion of the bolt and parts of the exposed surfaces of the hub 17. The plastic mixture hardens by drying so that it retains the form originally imparted to it by the confining surfaces, and may therefore be removed and again applied with the cup. I have found that the heat-insulating material thus applied protects the threaded portion of the bolt and the nut so that they are not liable to be rendered inseparable by heat.

The means for securing the cup 19 to the projecting cover fastener formed by the bolt and yoke may be variously modified, two modifications being shown by Figs. 4, 5 and 6. Fig. 4 shows a rod 25 inserted at its outer end in a hole formed for its reception in the cup and secured by suitable means such as a nut 27. The inner portion of the rod is arranged to bear on the periphery of the hub 17 and has an ear 28 arranged to bear on the inner end of the hub. Figs. 5 and 6 show, as an alternative form of cup-securing device, a rod 29 which may be a large sized wire nail or spike inserted in holes formed for its reception in opposite portions of the cup wall and arranged to bear on the bolt 15 and on the inner end of the hub, as shown by Fig. 6.

Having described my invention, I claim:

1. A hand hole cover protector composed of a cup formed to bear on a boiler head around a hand hole therein, and a securing member engaged with the cup and adapted to detachably engage a hand hole cover fastener projecting from said head, the cup being adapted to confine a body of heat-insulating material.

2. The combination with a boiler head and a hand hole cover having a bolt, nut, and yoke projecting through the hand hole in said head, of a cup formed to bear on the head around the hand hole, and a securing member engaged with the cup and adapted to detachably engage said yoke and hold the mouth of the cup against the head.

3. The combination with a boiler head and a hand hole cover having a bolt, nut, and yoke projecting through the hand hole in said head, of a cup formed to bear on the head around the hand hole, and an internal shouldered lug engaged with the cup and formed to engage the periphery and inner end of the yoke hub.

In testimony whereof I have affixed my signature, in presence of two witnesses.

FRANK WEBB.

Witnesses:
S. PEARL BROCK,
MARY DE CLECA.

Copies of this patent may be obtained for five cents each, by addressing the "Commissioner of Patents, Washington, D. C."